United States Patent
Rutland et al.

(10) Patent No.: US 11,726,839 B2
(45) Date of Patent: Aug. 15, 2023

(54) DATA PROCESSING

(71) Applicant: Arm Limited, Cambridge (GB)

(72) Inventors: Mark Salling Rutland, Cambridge (GB); Gareth Rhys Stockwell, Cambridge (GB); Christoffer Dall, Copenhagen (DK); Jade Ella Carla Alglave, Cambridge (GB)

(73) Assignee: Arm Limited, Cambridge (GB)

( * ) Notice: Subject to any disclaimer, the term of this patent is extended or adjusted under 35 U.S.C. 154(b) by 42 days.

(21) Appl. No.: 17/446,796

(22) Filed: Sep. 2, 2021

(65) Prior Publication Data

US 2022/0066840 A1    Mar. 3, 2022

(30) Foreign Application Priority Data

Sep. 3, 2020  (EP) .................................... 20305977

(51) Int. Cl.
    *G06F 9/52* (2006.01)
    *G06F 9/48* (2006.01)
(52) U.S. Cl.
    CPC ............ *G06F 9/524* (2013.01); *G06F 9/4881* (2013.01)
(58) Field of Classification Search
    CPC ................................. G06F 9/524; G06F 9/526
    USPC ........................................................ 710/200
    See application file for complete search history.

(56) References Cited

U.S. PATENT DOCUMENTS

| 4,649,513 | A | * | 3/1987 | Martin | .................. | G06F 40/174 |
|           |   |   |        |        |                    | 400/83 |
| 4,959,854 | A | * | 9/1990 | Cave | .................. | H04Q 3/54591 |
|           |   |   |        |        |                    | 379/165 |
| 5,317,727 | A | * | 5/1994 | Tsuchida | ........... | G06F 16/24552 |
|           |   |   |        |        |                    | 707/769 |
| 5,442,763 | A | * | 8/1995 | Bartfai | .................... | G06F 9/524 |
|           |   |   |        |        |                    | 710/200 |

(Continued)

FOREIGN PATENT DOCUMENTS

| EP | 0323013 A3 | 11/1988 |
| EP | 0323013 A2 | 7/1989 |

OTHER PUBLICATIONS

Chubb Peter, "Linux, Locking and Lots of Processors", Oct. 1, 2018 (Oct. 1, 2018), XP055777005, Retrieved from the Internet: URL: https://www.cse.unsw.edu.au/cs9242/18/lectures/10-linux.pdf; whole document.

(Continued)

*Primary Examiner* — Paul R. Myers
(74) *Attorney, Agent, or Firm* — Nixon & Vanderhye P.C.

(57) ABSTRACT

Apparatus comprises a data memory to store lock data for each of a set of processing resources, the lock data representing lock status data and tag data indicating a resource type selected from a plurality of resource types; and a processing element to execute an atomic operation with respect to the lock data for a given processing resource, the atomic operation comprising at least: a detection of whether the given processing resource is of a required resource type; a detection from the lock status data whether the given processing resource is currently unlocked; and when the given processing resource is detected to be currently unlocked and of the required resource type, performance of a predetermined action with respect to one or both of the lock status data and the tag data.

15 Claims, 11 Drawing Sheets

(56) References Cited

U.S. PATENT DOCUMENTS

| | | | | |
|---|---|---|---|---|
| 5,485,607 | A * | 1/1996 | Lomet | G06F 16/2343 710/200 |
| 5,604,904 | A * | 2/1997 | Kini | G06F 9/4411 719/318 |
| 5,895,492 | A * | 4/1999 | Greenspan | G06F 9/526 711/147 |
| 5,983,225 | A * | 11/1999 | Anfindsen | G06F 16/2343 710/200 |
| 5,991,793 | A * | 11/1999 | Mukaida | G06F 9/5011 718/104 |
| 6,009,269 | A * | 12/1999 | Burrows | G06F 11/3636 717/130 |
| 6,044,367 | A * | 3/2000 | Wolff | G06F 16/1767 707/999.001 |
| 6,226,376 | B1 * | 5/2001 | Horan | H04Q 3/54591 379/279 |
| 6,449,614 | B1 * | 9/2002 | Marcotte | G06F 9/526 |
| 6,529,983 | B1 * | 3/2003 | Marshall | G06F 9/52 710/200 |
| 6,751,617 | B1 * | 6/2004 | Anfindsen | G06F 16/2343 710/200 |
| 6,757,769 | B1 * | 6/2004 | Ofer | G06F 9/524 710/200 |
| 6,981,108 | B1 * | 12/2005 | Zeira | G06F 9/526 709/248 |
| 7,215,663 | B1 * | 5/2007 | Radulovic | H04L 47/803 370/356 |
| 7,246,187 | B1 * | 7/2007 | Ezra | G06F 9/526 710/200 |
| 9,882,828 | B1 * | 1/2018 | Sandlerman | H04L 47/74 |
| 11,126,474 | B1 * | 9/2021 | Zidenberg | G06F 9/5016 |
| 11,245,608 | B1 * | 2/2022 | Kumar | H04L 47/825 |
| 2002/0120744 | A1 * | 8/2002 | Chellis | G06F 9/50 709/224 |
| 2003/0028638 | A1 * | 2/2003 | Srivastava | G06F 9/524 709/225 |
| 2003/0046552 | A1 * | 3/2003 | Hamid | G06F 21/34 713/186 |
| 2003/0145146 | A1 * | 7/2003 | Posner | G06F 9/526 710/200 |
| 2004/0199734 | A1 * | 10/2004 | Rajamani | G06F 9/526 711/158 |
| 2006/0206901 | A1 * | 9/2006 | Chan | G06F 9/524 718/107 |
| 2006/0259907 | A1 * | 11/2006 | Bhatia | G06F 9/526 718/104 |
| 2007/0053381 | A1 * | 3/2007 | Chacko | H04L 47/823 370/395.2 |
| 2008/0244600 | A1 * | 10/2008 | Wong | G06F 9/5022 718/104 |
| 2009/0125703 | A1 * | 5/2009 | Mejdrich | G06F 15/7825 712/30 |
| 2011/0231550 | A1 * | 9/2011 | Murray | G06F 9/5011 709/226 |
| 2014/0068127 | A1 * | 3/2014 | Baron | G06F 9/526 710/200 |
| 2015/0095660 | A1 * | 4/2015 | Gammel | G06F 21/72 713/192 |
| 2015/0304264 | A1 * | 10/2015 | Kabbes | H04L 51/42 709/206 |
| 2017/0220390 | A1 * | 8/2017 | Jain | G06F 9/524 |
| 2017/0249163 | A1 | 8/2017 | Petkov et al. | |
| 2018/0260229 | A1 * | 9/2018 | Masters | G06F 1/3225 |
| 2020/0117616 | A1 * | 4/2020 | Parker | G06F 9/45558 |
| 2020/0125422 | A1 * | 4/2020 | Lev | G06F 9/526 |
| 2020/0401463 | A1 * | 12/2020 | Weishaupt | G06F 9/526 |

OTHER PUBLICATIONS

Dijkstra, Edsger W., "Hierarchical Ordering of Sequential Processes", Springer Science + Business Media New York 1971.

Dijkstra, Edsger W., "Two starvation-free solutions of a general exclusion problem", Plataanstraat 5, 5671 Al Nuenen the Netherlands.

* cited by examiner

DATA PROCESSING

CROSS-REFERENCE TO RELATED APPLICATIONS

This application claims priority pursuant to 35 U.S.C. 119(a) to European Patent Application No. 20305977.9, filed Sep. 3, 2020, which application is incorporated herein by reference in its entirety.

BACKGROUND

This disclosure relates to data processing methods and apparatus.

In a data processing system in which multiple processing elements, processes including threads or the like, can share processing resources such as memory granules or regions, there can be a need to provide locking of those processing resources while a particular processing element, process, thread or the like is accessing them so as to avoid conflict of access.

Processing resources can also be associated with different respective resource types. For example, memory granules can be allocated for data storage, page table entry storage, metadata storage or other functionality. This allocation is not necessarily performed by the same entity which is attempting to lock a given processing resource.

SUMMARY

In an example arrangement there is provided apparatus comprising:
  a data memory to store lock data for each of a set of processing resources, the lock data representing lock status data and tag data indicating a resource type selected from a plurality of resource types; and
  a processing element to execute an atomic operation with respect to the lock data for a given processing resource, the atomic operation comprising at least:
    a detection of whether the given processing resource is of a required resource type;
    a detection from the lock status data whether the given processing resource is currently unlocked; and
    when the given processing resource is detected to be currently unlocked and of the required resource type, performance of a predetermined action with respect to one or both of the lock status data and the tag data.

In another example arrangement there is provided a method comprising:
  storing lock data for each of a set of data processing resources, the lock data representing lock status data and tag data indicating a resource type selected from a plurality of resource types; and
  executing an atomic operation with respect to the lock data for a given processing resource, the atomic operation comprising at least:
    detecting whether the given processing resource is of a required resource type;
    detecting from the lock status data whether the given processing resource is currently unlocked; and
    when the given processing resource is detected to be currently unlocked and of the required resource type, performing a predetermined action with respect to one or both of the lock status data and the tag data.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Data Processing Apparatus

Example embodiments are applicable to various types of data processing apparatus, in which a data memory and a processing element are provided. First and second examples of suitable apparatus will now be described as technical background to the techniques to be described further below. Fundamentally the present techniques are applicable (for example) to any arrangement in which a body of trusted software interacts with resources which are logically managed by untrusted software. The first and second example data processing apparatus discussed below simply provide examples of data processing environments in which the present techniques may be implemented.

First Example Data Processing Apparatus

Figure 1:
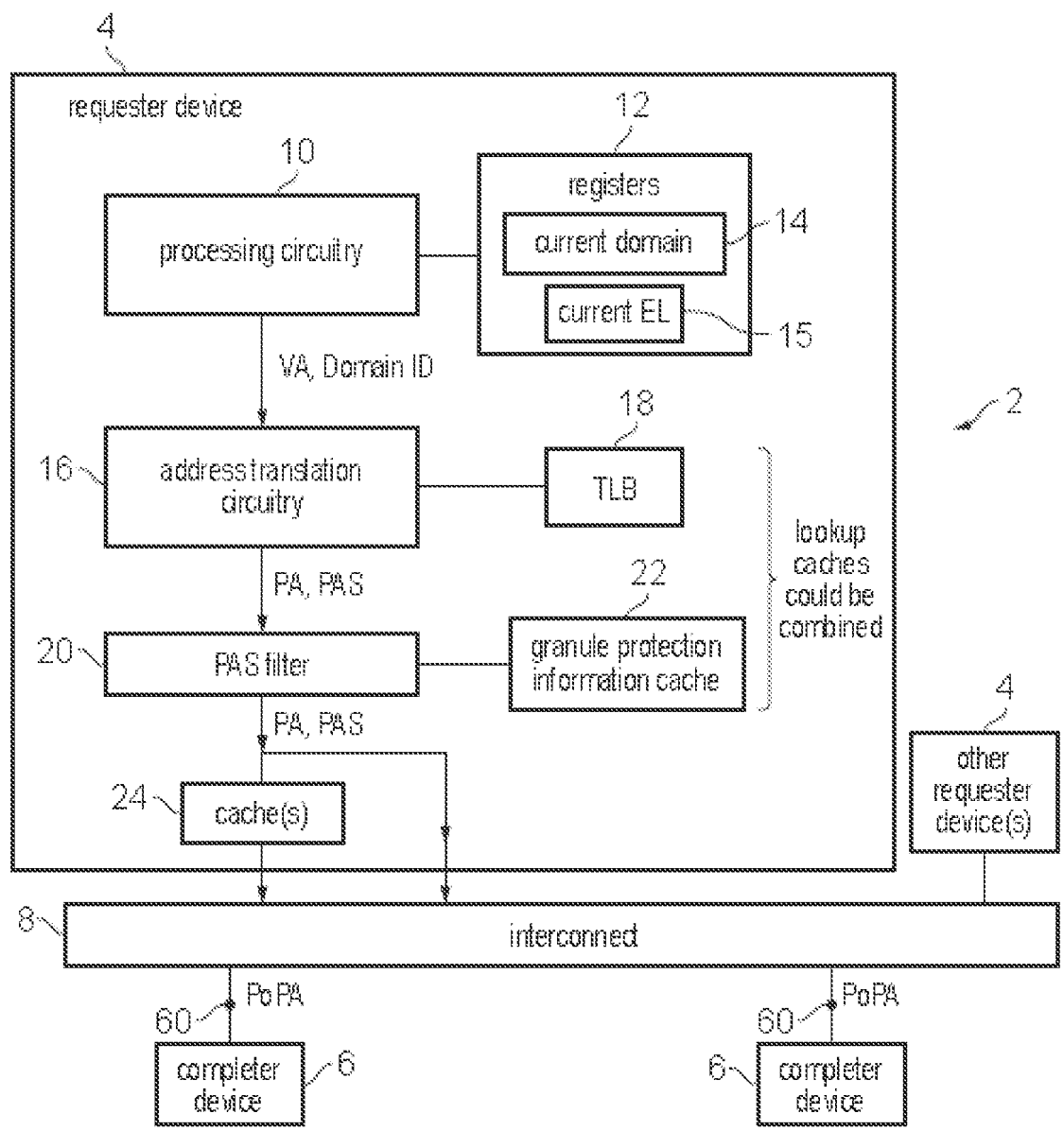
FIG. 1 schematically illustrates an example of a data processing apparatus.

Referring now to the drawings, FIG. 1 schematically illustrates an example of a data processing system or apparatus 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. The granule protection information may be cached within a granule protection information cache 22, similar to a caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. in other words, the processing element may be configured to execute program instructions at a prevailing security state selected from a set of security states, each security state being associated with respective security privileges so that instructions executed in one security state cannot access resources accessible to instructions executed at another security state exception level. This can be useful for security purposes.

Figure 2:
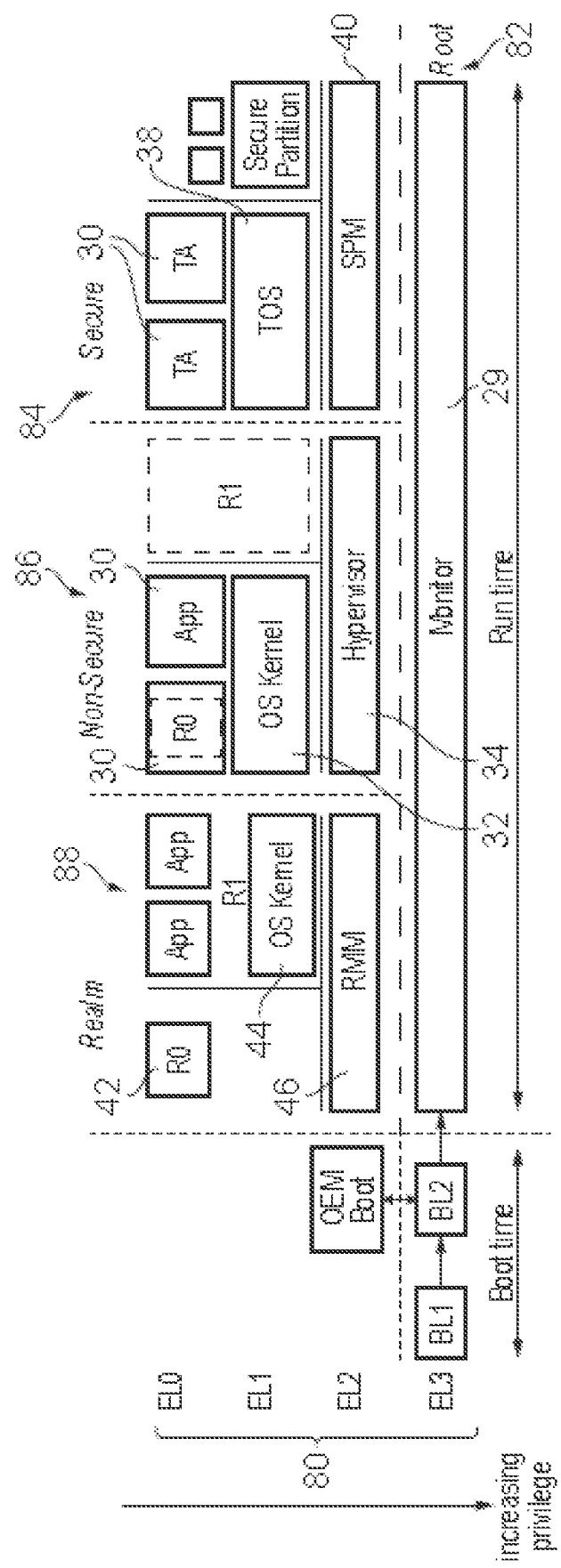
FIG. 2 schematically illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite (or at least a different) numbering, for example so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 24. In the realm domain, the software executed can include a number of realms, where each realm can be isolated from other realms by a realm management monitor (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
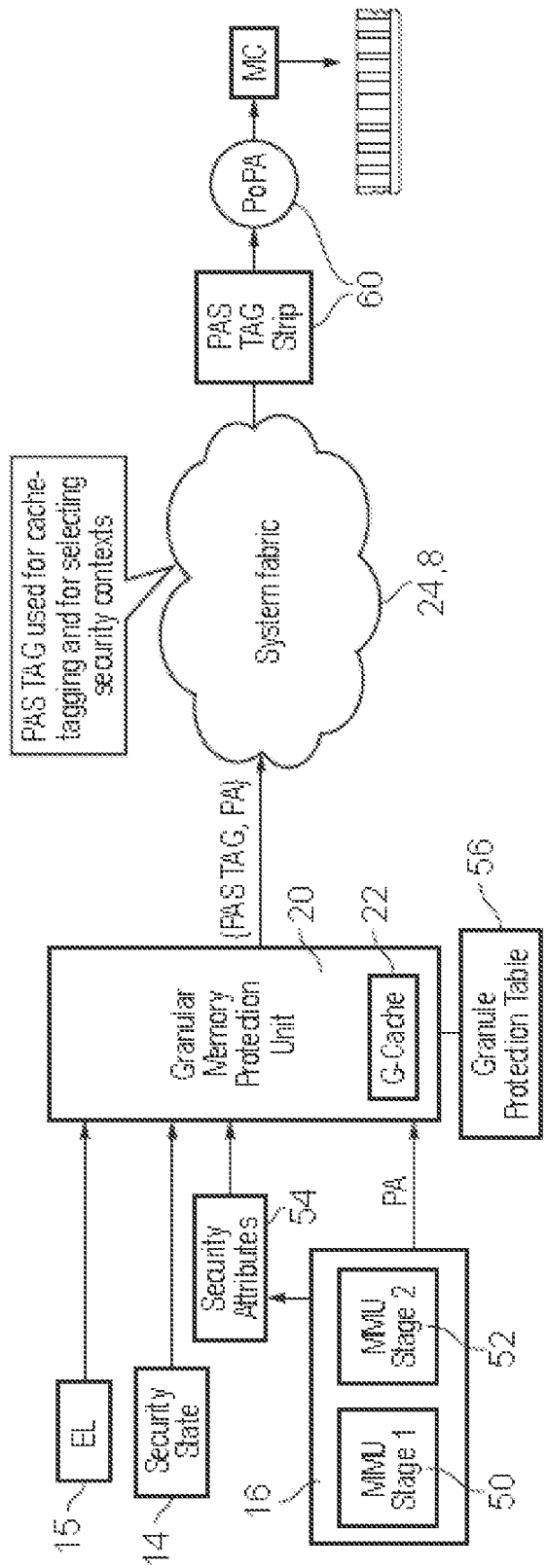
FIG. 3 schematically illustrates an example of a processing system supporting granule protection lookups.

FIG. 3 schematically illustrates another example representation of the processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or EL1 code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM 40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side without diminishing the security guarantees comparing to Slave-side filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System—"Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

Figure 4:
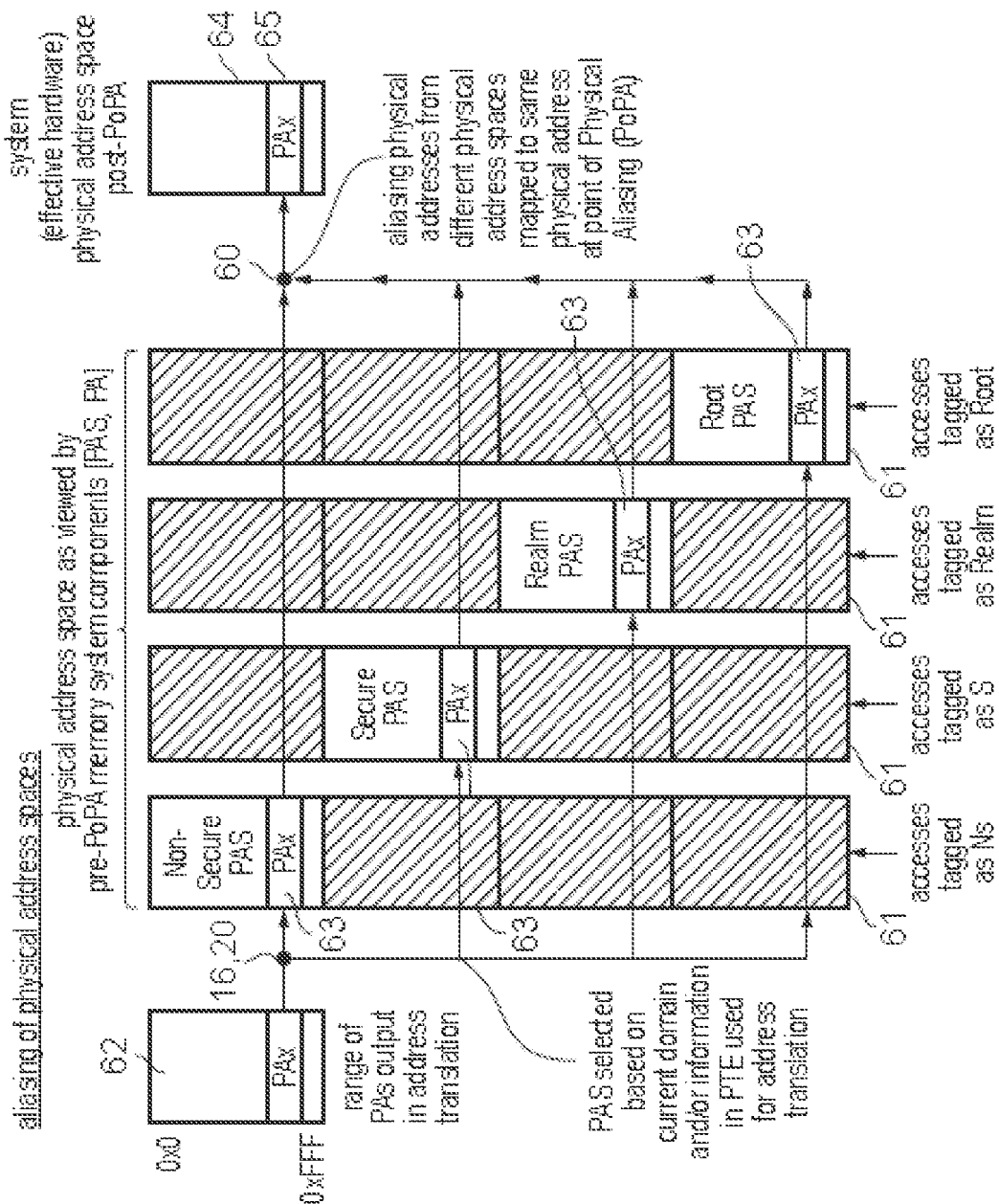
FIG. 4 schematically illustrates aliasing of a number of physical address spaces onto a system physical address space identifying locations in the memory system.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
| --- | --- | --- | --- | --- |
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

The system may include more than one PoPA 60 (e.g. as shown in FIG. 14 discussed below). At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

Second Example Data Processing Apparatus

Figure 5:
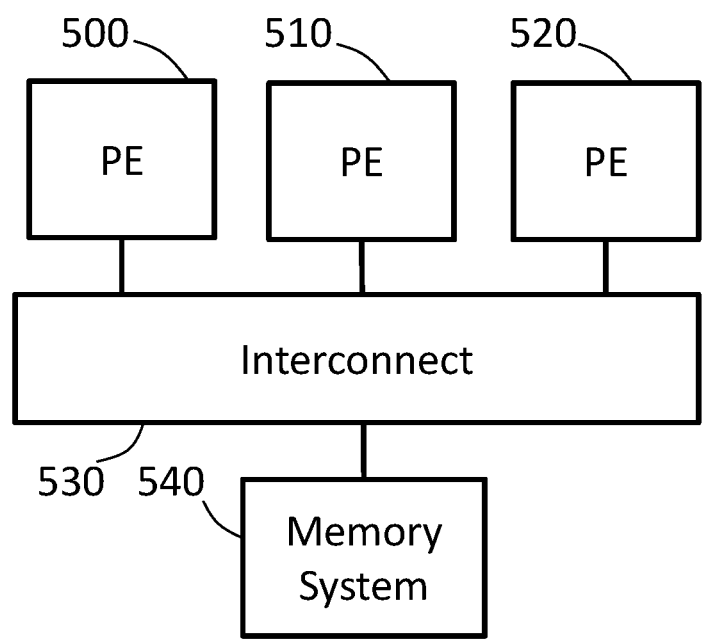
FIG. 5 schematically illustrates another example of a data processing apparatus.

FIG. 5 schematically illustrates a second example of a suitable data processing apparatus for performing the techniques to be discussed in more detail below. One or more processing elements (PE) 500, 510, 520 are provided, which as before may be CPUs, GPUs or the like. The PEs 500 . . . 520 are capable of executing program instructions at a prevailing security state selected from a set of security states, each security state being associated with respective security privileges so that instructions executed in one security state cannot access resources accessible to instructions executed at another security state exception level. However, it is not necessarily a requirement that the particular arrangement of worlds and realms is provided as discussed above.

In some examples, one or more of the PEs may execute an untrusted process such as a hypervisor process in a particular security state and another, trusted, process to be discussed below in a different security state.

The PEs are connected via an interconnect 530 to various peripheral devices, only one of which (a memory system 540) is shown in FIG. 5.

Locking of Resources

Where more than one PE is provided, or where different processes or threads are executed by a given PE, those PEs, processes or threads can share processing resources such as memory granules provided by the memory system 540 or the equivalent arrangements described with reference to FIGS. 1-4. In order to allow this to occur without conflict of access to a particular processing resource, a system of locking of such resources is provided and will be described further below.

In the context of the arrangement of FIGS. 1-4, the RMM mentioned above represents a trusted software component which mediates between a hypervisor and a realm in order to allow processes or agents outside of the realm's trusted computing base to manage system resources without violating the security properties of the realm. The RMM does not itself (in these example embodiments) include a memory allocator but instead relies on an untrusted process (for example forming part of the functionality of the hypervisor) to associate functionality with granules of memory. Examples of such functionality includes the provision of page table entries and the like. The RMM oversees the actual transitioning of memory granules from one state to another and how a granule can be used depending on its state.

Therefore, in examples, the processing resources under discussion may comprise respective addressable granules within a memory address space.

Both the data structure describing each memory granule and the contents of the memory granules themselves can at least in principle be accessed by multiple CPUs concurrently and as mentioned above, to avoid conflicts of access, this multiple potential access is synchronised using locks.

In the context of the RMM, objects handled by the RMM are memory granules provided to it from a process such as a hypervisor outside the realm's trusted computing base, and the pointers to these memory granules therefore cannot necessarily be trusted. Although the RMM may operate with respect to an expected object type for a particular memory granule, without using the techniques described below, the RMM would not be able to validate the type of an object without first acquiring a lock on the object. However, given that locking may need to be carried out in an ordering (for example, a predetermined ordering or an ordering established at system boot) applied with reference to other locked objects of the same type in order to avoid deadlocks or similar problems, the lack of ability of the RMM to be sure of the type of an object before locking it could potentially cause operational problems.

With regard to the more generic arrangement of FIG. 5, (i) association of object types with objects such as memory granules and (ii) locking can be performed by separate processes, threads or CPUs which do not necessarily trust one another.

Tag Locks

Figure 6:
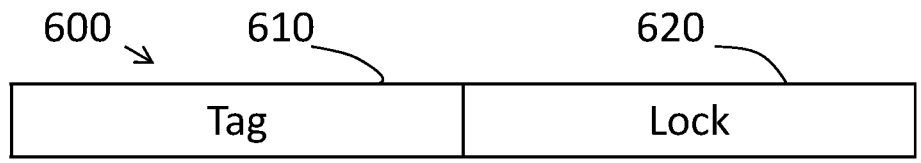
FIG. 6 schematically illustrates a so-called tag-lock.

FIG. 6 schematically illustrates a so-called tag lock 600 representing at least a component of a locking technique which addresses the potential issues outlined above. Tag locks are particularly applicable for use in connection with the RMM of the arrangement of FIGS. 1-4, but are generally applicable to use in any arrangement that needs to synchronise access to objects of unknown (or at least potentially unknown or untrusted) types, such as the generic data processing arrangement of FIG. 5. In the discussion that follows, a tag lock will be referred to as a "tag_lock" for consistency between the text description and the code examples.

A technique using tag locks may operate by evaluating the type of an object to be locked and attempting to acquire a lock as a single atomic operation. Here, the reference to "atomic operation" refers to an overall operation which is either fully and indivisibly completed or is not completed. This therefore implies that where an atomic operation comprises first and second operations, the atomic operation either completes successfully (in that both the first and second operations complete successfully and any results from them are observable) or does not complete (in which case neither any results of the first operation nor any results of the second operation are observable).

As an illustrative example, the data structure for a tag_lock can be described in the C language as follows:

```C
typedef union tag_lock {
uint64_t tl;
struct {
uint32_t t;
uint32_t l;
};
}tag_lock_t
```

Here, the function "typedef" gives the definition a readable name, and the expression "union" represents the allocation of memory items all together. The references to "uintXX" relate to unsigned integer variables of a given size XX in bits. But in summary, in this example, the tag_lock 600 is provided as an 8 byte unsigned integer, 4 bytes of which represent the tag data and 4 bytes of which represents the lock or lock status data.

An atomic operation on the tag_lock occurs with respect to all 8 bytes of the tag_lock 600. It is this property of the tag_lock (the ability to perform an operation on all 8 bytes including the tag data and the lock status data) that allows such an atomic operation to be performed.

For example, the resource type indicated by the tag data may be a type selected from the list consisting of:
 a resource type indicating a granule storing page table object providing address translation information;
 a resource type indicating a granule storing process execution context information;
 a resource type indicating a granule storing working data for use by a program executed by the processing element; and
 a resource type indicating a granule storing a metadata object.

The corresponding resource (such as a memory granule) may be of the type indicated by the respective resource type.

Lock Acquisition

Figure 7:
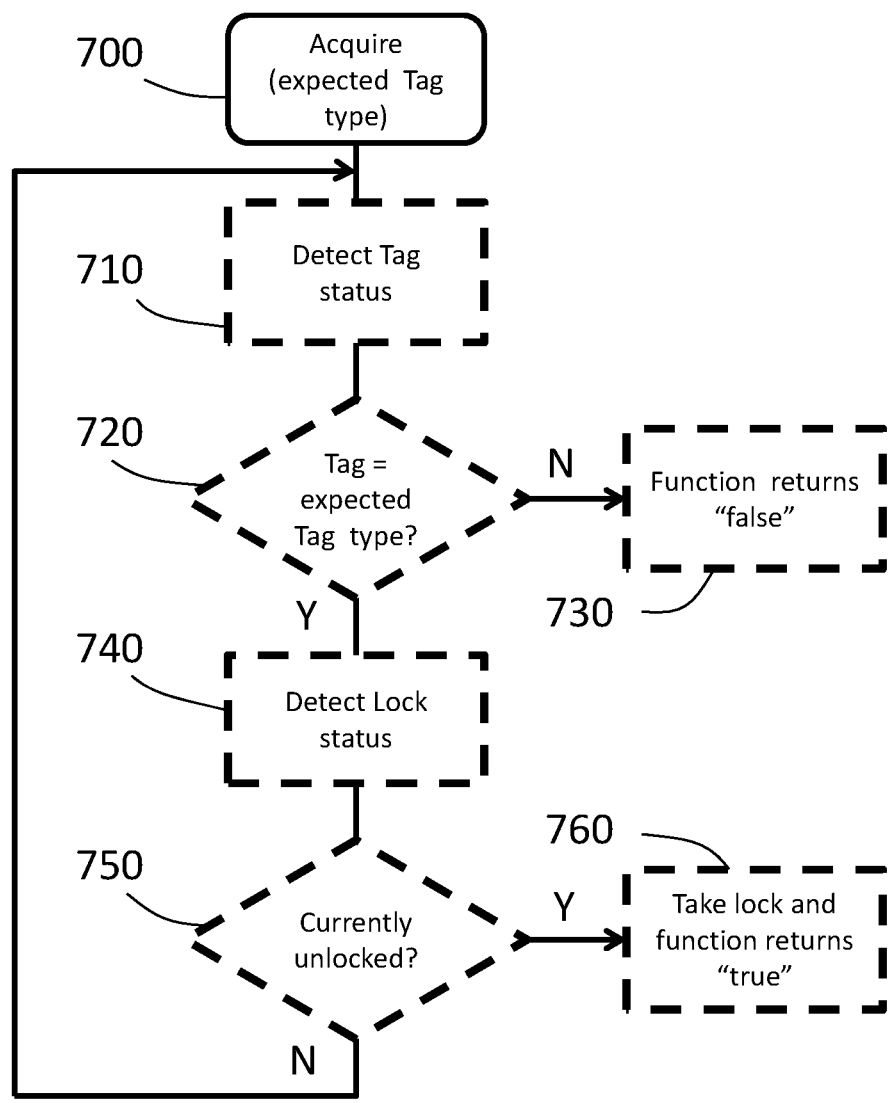
FIGS. 7 to 12 are schematic flowcharts illustrating respective methods.

FIG. 7 is a schematic flowchart representing a lock acquisition process which may be expressed in the following example form, where tag_lock_t*tl is the tag_lock being acquired and uint32_t expected_type is the expected resource type. The example function returns a Boolean outcome indicating the success of failure of the atomic operation to be discussed below:
 'bool tl_try_acquire(tag_lock_t*tl, uint32_t expected_type)'.

The process starts at a step 700. Steps 710, 720, 740, 750, 760 are shown schematically as successive steps in FIG. 7 for clarity of the explanation, but in fact (as indicated by their common broken line outline in FIG. 7) are performed as an atomic operation of the type discussed above. These steps as drawn involve detecting the current tag status or value of a given tag_lock at the step 710, detecting 720 whether the current tag type is the same as an expected tag type, detecting 740 the current lock status, detecting 750 whether the tag_lock is currently unlocked and when the type is as expected and currently unlocked (that is to say, not currently locked, for example by another process (on that or another processing element) or by processing element), performing 760 an operation such as locking the tag_lock.

As mentioned, these steps are performed as a single atomic operation. If the step 720 shows that the tag is not of the expected tag type then the atomic operation fails at a schematic step 730.

If the tag is of the expected tag type but the tag_lock is currently locked by another process or processing element (that is to say, not currently unlocked) then, as shown by the negative outcome from the step 750, the locking process "spins" and waits for the tag_lock to be available in an unlocked condition. During this waiting process, if at any stage the tag indicates a type which is not the expected type, for example because in the meantime another CPU or process to which the tag_lock is locked has changed the type associated with that tag_lock, then the atomic operation fails at the step 730.

If, however, the tag is of the expected type and the lock status is such that the tag_lock is currently unlocked then control passes to the step 760 at which the lock is taken and the function completes successfully.

The apparatus of FIGS. 1-4 or the apparatus of FIG. 5 operating according to this technique therefore provides an example of an apparatus comprising: a data memory 6, 540 to store lock data for each of a set of processing resources, the lock data representing lock status data and tag data indicating a resource type selected from a plurality of resource types; and a processing element 4, 500-520 to execute an atomic operation with respect to the lock data for a given processing resource, the atomic operation comprising at least: a detection 710, 720 of whether the given processing resource is of a required resource type; a detection 740, 750 from the lock status data whether the given processing resource is currently unlocked; and when the given processing resource is detected to be currently unlocked and of the required resource type, performance 760 of a predetermined action with respect to one or both of the lock status data and the tag data.

The first operation 710, 720 is configured to fail 730 in response to a detection that the given processing resource is of a resource type different to the required resource type.

For example, the predetermined action may comprise setting (760) the lock status data to indicate that the given processing resource is locked by that process and/or processing element. This may involve applying a lock ordering (such as a predetermined ordering) of the given processing resource with respect to other currently locked processing resources of the same resource type as the required resource type, the lock ordering defining an order by which processing resources of the same resource type as the required resource type are locked and unlocked, and/or applying a second lock ordering (such as a predetermined ordering) of the given processing resource with respect to other currently locked processing resources, the second lock ordering defining an order by which processing resources are locked and unlocked. These are techniques which are used to coordinate the locking and unlocking of resources as between different processing elements, processes or stages in a process. For example, in the context of resources representing page table data, these may need to be locked and unlocked in a hierarchical order appropriate to the branching structure of the page table itself. By applying a lock ordering with respect to other currently locked processing resources of the same resource type (the type being, for example, page table data or data relating to a particular page table walk) the locking and unlocking of the page table granules can be performed in the correct serialised order. However, by also optionally allowing application of a lock ordering with respect to other currently locked processing resources, a global serialisation of locking and unlocking can also be provided.

As discussed, in response to a detection that the given processing resource is currently locked by another process or processing element and is of the required resource type, the process of FIG. 7 involves (by the loop back from the negative outcome of the step 750 to the step 710) waiting until the given processing resource becomes unlocked. As mentioned, this can be arranged to fail if at any stage during the waiting the tag is detected no longer to represent the expected tag type.

These arrangements can operate with respect to a multi-processor system of the type described above, comprising a set of two or more processing elements configured to access the one or more processing resources, each of the processing elements being configured to execute the atomic operation with respect to the lock data.

Overview of Example Use of Tag_Locks

The atomic operation (comprising a detection of the lock status and the resource type, and the locking or other predetermined operation) may be used in connection with various operations ("rmm_command" in the example code below) having an associated data granule address "expected_data_granule_addr".

void rmm_command(unsigned long expected_data_granule_addr) {
   tag_lock_t*tl;
   bool r;
[In the following code section, the tag_lock data for the address expected_data_granule_addr is located by a function addr_to_tl, and a Boolean variable r is set to indicate the success or failure of an atomic attempt to acquire that lock (using the techniques of FIG. 7) according to an expected resource type of TYPE_DATA_GRANULE.]
tl=addr_to_tl(expected_data_granule_addr);
r=tl_try_acquire(tl, TYPE_DATA_GRANULE);
if(!r)
   return;
[The code reaches this point only when the previous steps, as indicated by the variable r, were successful. An operation, indicated as a generic "CRITICAL SECTION ACCESSING DATA GRANULE CONTENTS" may then take place while the tag_lock is locked to the present process . . . ]
/*CRITICAL SECTION ACCESSING DATA GRANULE CONTENTS */
[ . . . before the tag_lock is released]
   tl_release(tl);
}

Tag Reading Function

Figure 8:
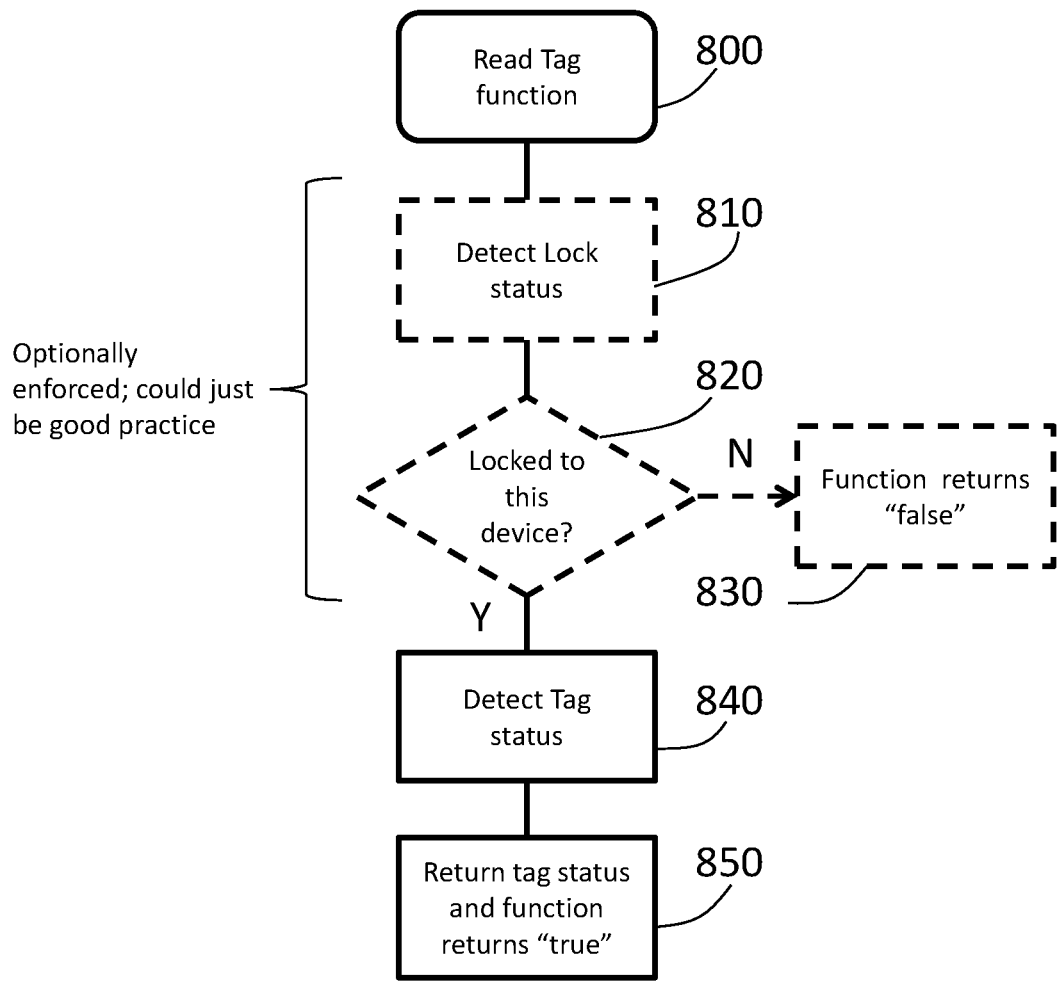

FIG. 8 is a schematic flowchart representing a read tag function 800
   uint32_t tl_get_tag
   with an argument tag_lock_t*tl representing the tag_lock concerned. This can be expressed as:
*'uint32 ttl_get_tag(tag_lock_t*tl)'.

Optionally, steps 810, 820, 830 can be provided, such that the lock status is detected at the step 810 and if at the step 820 the tag_lock is not currently locked to the device attempting to read the tag status then the function can fail at the step 830. However, as mentioned these steps are optionally enforced and instead could be left to good practice so that the read tag function is not called except in circumstances where the calling device or process already holds the relevant lock.

At a step 840, the current tag status is detected and this is returned along with an indication of successful completion of the function at a step 850.

This therefore provides an example, while the given processing resource is currently locked by that processing element, of providing a data output indicative of the resource type represented by the tag data associated with the given processing resource.

Release Lock Function

Figure 9:
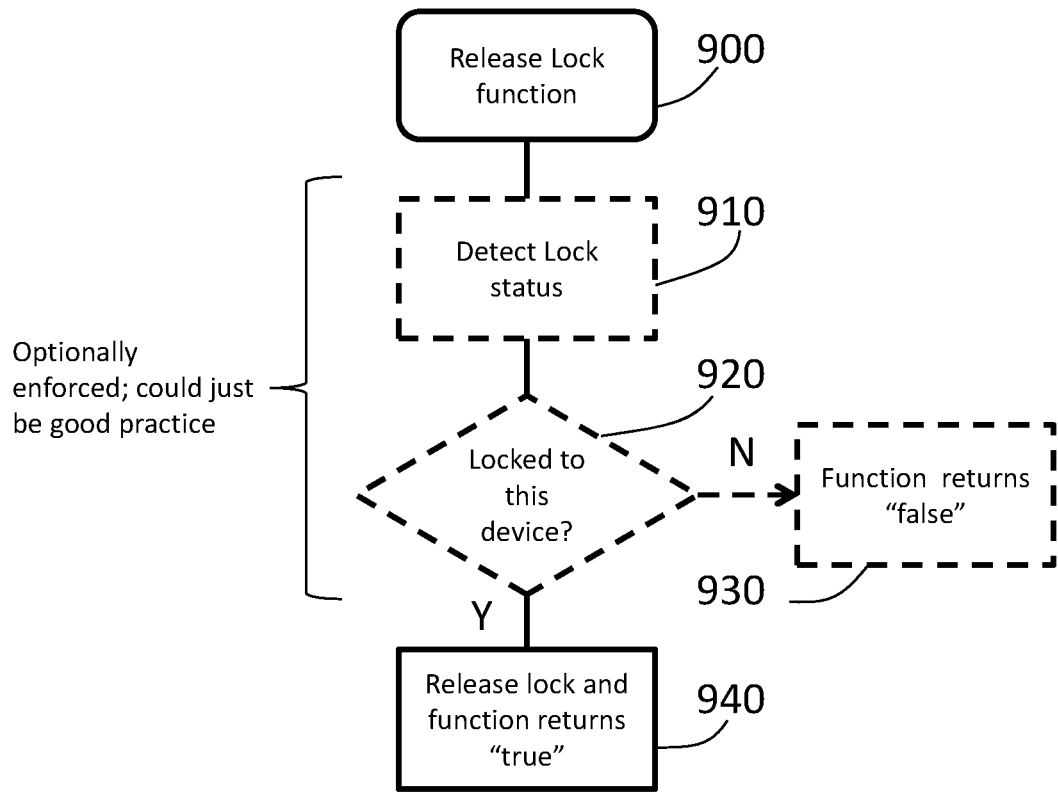

FIG. 9 is a schematic flowchart representing a release lock function "tl_release" 900. This can be expressed as:
*'void tl_release(tag_lock_t*tl)'.

As before, optionally, steps 910, 920, 930 can be provided, such that the lock status is detected at the step 910 and if at the step 920 the tag_lock is not currently locked to the device attempting to release the lock then the function can fail at the step 930. However, as mentioned these steps are optionally enforced and instead could be left to good practice so that the release lock function is not called except in circumstances where the calling device or process already holds the relevant lock.

At a step 940, the lock is released and the function returns a successful outcome.

Write Tag and Release Function

Figure 10:
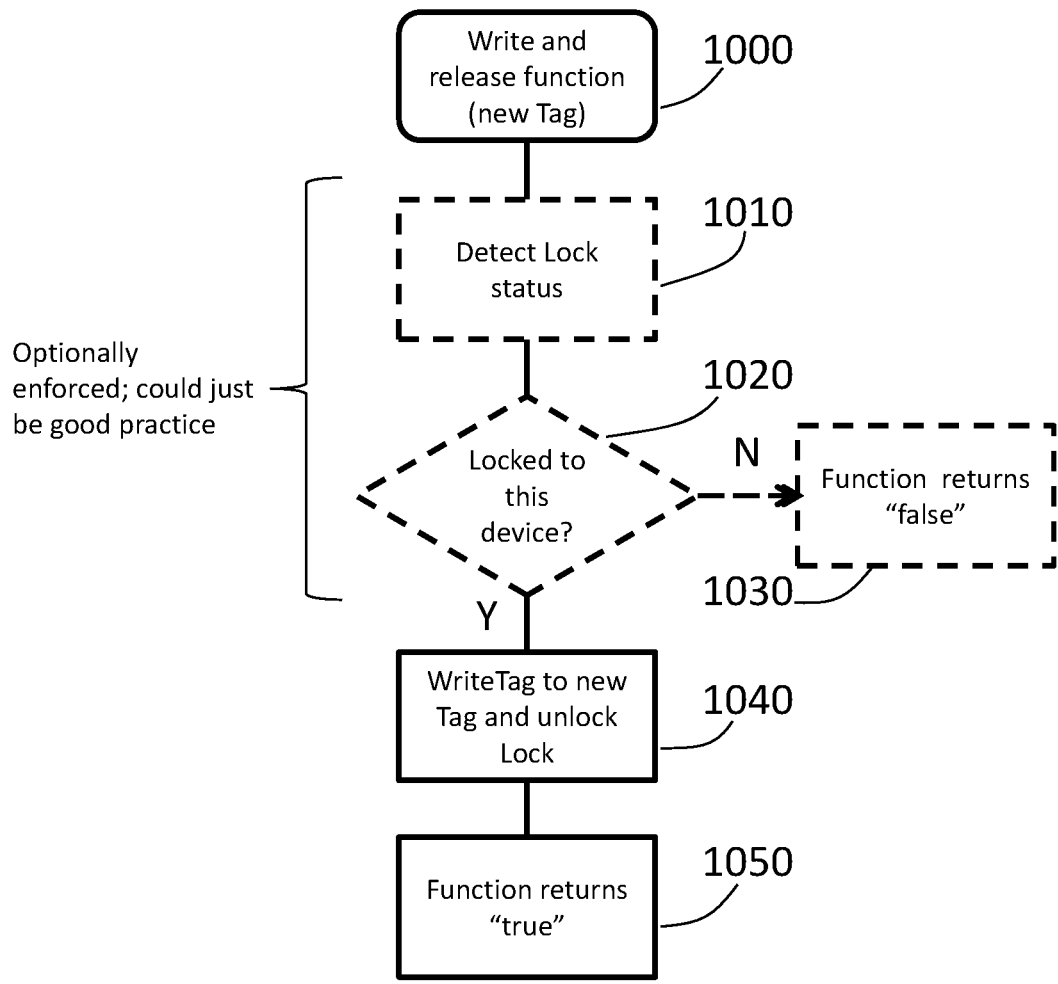

FIG. 10 is a schematic flowchart representing a release lock function "tl_set_release" 1000 with a second argument indicating a new resource type "uint32_t new type". This can be expressed as:
*'void tl_set_release(tag_lock_t*tl, uint32_t new type)'.

As before, optionally, steps 1010, 1020, 1030 can be provided, such that the lock status is detected at the step 1010 and if at the step 1020 the tag_lock is not currently locked to the device attempting to perform this function then the function can fail at the step 1030. However, as mentioned these steps are optionally enforced and instead could be left to good practice so that the function is not called except in circumstances where the calling device or process already holds the relevant lock.

A step 1040 involves executing an atomic unlocking operation with respect to the lock data for the given processing resource, the atomic unlocking operation comprising first and second unlocking operations, the first unlocking operation comprising unconditionally changing the tag data to indicate a resource type potentially different to the resource type previously indicated by the tag data and the second unlocking operation comprising setting the lock status data to indicate that the given processing resource is unlocked.

At a step 1050, the function returns a successful outcome.

Tag Change Function

Figure 11:
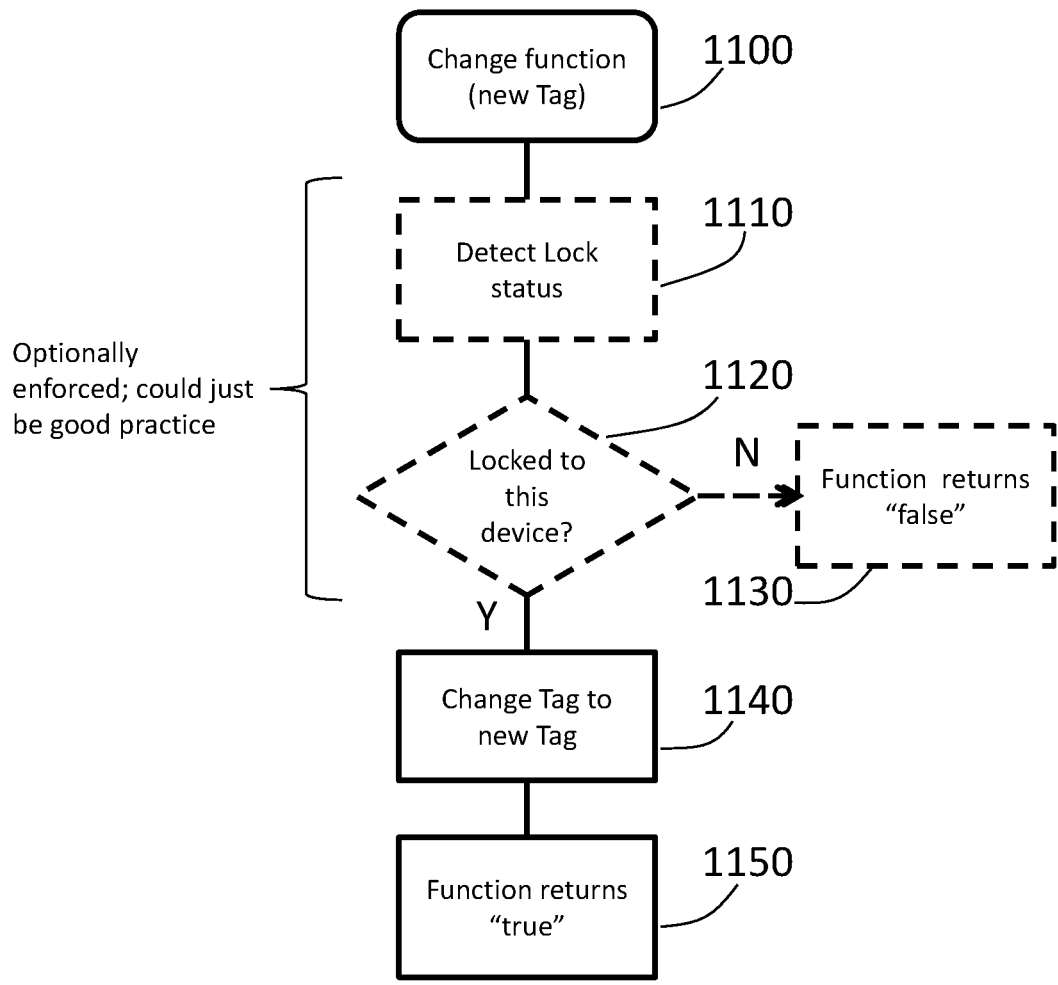

FIG. 11 is a schematic flowchart representing a release lock function 1100. This can be expressed as:
*'void tl_set_tag (tag_lock_t*tl, uint32_t new type)'.

As before, optionally, steps 1111, 1120, 1130 can be provided, such that the lock status is detected at the step 1110 and if at the step 1120 the tag_lock is not currently locked to the device attempting to perform this function then the function can fail at the step 1130. However, as mentioned these steps are optionally enforced and instead could be left to good practice so that the function is not called except in circumstances where the calling device or process already holds the relevant lock.

A step 1140 involves, while the given processing resource is currently locked by that processing element, writing a given resource type to the tag data. At a step 1150 the function returns a successful outcome. In other words, this is similar to the arrangement of FIG. 10 but without the releasing of the tag_lock.

Interaction with Hypervisor Process

As mentioned above, the resource type for a given processing resource can be associated with a granule by a hypervisor or other further process executed by the same or another processing element. In this arrangement the hypervisor or other further process determines a resource type for a granule or other resource, but relies on calling a process by the RAM or similar trusted arrangement in order to set the tag_lock (using the techniques of FIG. 10 or 11 for example) to the newly associated resource type.

Therefore, in examples the processing element is configured to initiate the atomic operation to lock the given processing resource and, when the given processing resource is locked, to set the tag data for the given processing resource to indicate the resource type associated with the given processing resource by the further process.

Summary Method

Figure 12:
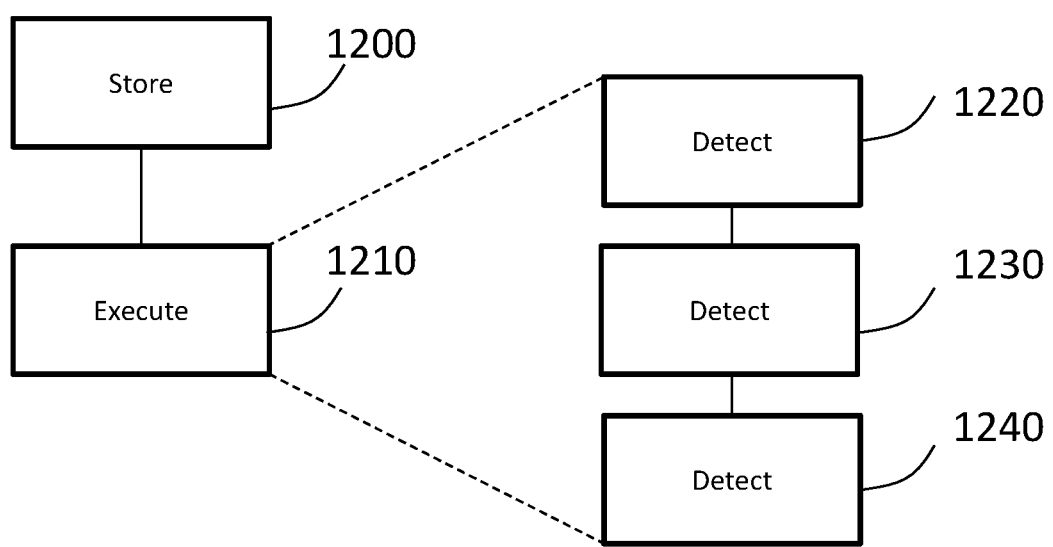

FIG. 12 is a schematic flowchart illustrating an example method comprising:
- storing (at a step 1200) lock data for each of a set of processing resources, the lock data representing lock status data and tag data indicating a resource type selected from a plurality of resource types; and
- executing (at a step 1210) an atomic operation with respect to the lock data for a given processing resource, the atomic operation comprising at least:
  - detecting (at a step 1220) whether the given processing resource is of a required resource type;
  - detecting (at a step 1230) from the lock status data whether the given processing resource is currently unlocked; and
  - when the given processing resource is detected to be currently unlocked and of the required resource type, performing (at a step 1240) a predetermined action with respect to one or both of the lock status data and the tag data.

SUMMARY

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Apparatus comprising:
   - a data memory to store lock data for each of a set of processing resources, the lock data representing lock status data and tag data indicating a resource type selected from a plurality of resource types; and
   - a processing element to execute an atomic operation with respect to the lock data for a given processing resource, the atomic operation comprising at least:
     - a detection from the tag data of whether the given processing resource is of a required resource type;
     - a detection from the lock status data whether the given processing resource is currently unlocked; and
     - when the given processing resource is detected to be currently unlocked and of the required resource type, performance of a predetermined action with respect to one or both of the lock status data and the tag data,
   - wherein the processing element is configured to determine, depending on the detection from the tag data of whether the given processing resource is of the required resource type, whether to perform the predetermined action when the given processing resource is detected to be currently unlocked.

2. The apparatus of claim 1, in which the predetermined action comprises setting the lock status data to indicate that the given processing resource is locked by a process executed by that processing element.

3. The apparatus of claim 1, in which the processing element is configured, in response to a detection that the given processing resource is not currently unlocked and is of the required resource type, to wait until the given processing resource becomes unlocked.

4. The apparatus of claim 1, in which the atomic operation is configured to fail in response to a detection that the given processing resource is of a resource type different to the required resource type.

5. The apparatus of claim 1, in which the processing element is configured to apply a lock ordering of the given processing resource with respect to other currently locked processing resources of the same resource type as the required resource type, the lock ordering defining an order by which processing resources of the same resource type as the required resource type are locked and unlocked.

6. The apparatus of claim 5, in which the processing element is configured to apply a second lock ordering of the given processing resource with respect to other currently locked processing resources, the second lock ordering defining an order by which processing resources are locked and unlocked.

7. The apparatus of claim 1, in which the processing element is configured, while the given processing resource is currently locked by that processing element, to write a given resource type to the tag data.

8. The apparatus of claim 1, in which the processing element is configured, while the given processing resource is currently locked by that processing element, to provide a data output indicative of the resource type represented by the tag data associated with the given processing resource.

9. The apparatus of claim 1, in which the processing element is configured to execute an atomic unlocking operation with respect to the lock data for the given processing resource, the atomic unlocking operation comprising first and second unlocking operations, the atomic unlocking operation comprising changing the tag data to indicate a resource type different to the required resource type, and setting the lock status data to indicate that the given processing resource is unlocked.

10. The apparatus of claim 1, in which the processing resources comprise respective addressable granules within a memory address space, and in which the resource type is a type selected from the list consisting of:
- a resource type indicating a granule storing page table object providing address translation information;
- a resource type indicating a granule storing process execution context information;
- a resource type indicating a granule storing working data for use by a program executed by the processing element; and
- a resource type indicating a granule storing a metadata object.

11. The apparatus of claim 1, comprising a set of two or more processing elements configured to access the one or more processing resources, each of the processing elements being configured to execute the atomic operation with respect to the lock data.

12. The apparatus of claim 1, in which the processing element is configured to execute a further process to associate a resource type with the given processing resource.

13. The apparatus of claim 12, in which the processing element is configured to initiate the atomic operation and to lock the given processing resource and, when the given processing resource is locked, to set the tag data for the given processing resource to indicate the resource type associated with the given processing resource by the further process.

14. The apparatus of claim 12, in which:
the processing element is configured to execute program instructions at a prevailing security state selected from a set of security states, each security state being associated with respective security privileges so that instructions executed in one security state cannot access resources accessible to instructions executed at another security state exception level;
in which the processor is configured to execute instructions at a predetermined one of the security states in order to perform the atomic operation with respect to the lock data.

15. A method comprising:
storing lock data for each of a set of processing resources, the lock data representing lock status data and tag data indicating a resource type selected from a plurality of resource types; and
executing an atomic operation with respect to the lock data for a given processing resource, the atomic operation comprising at least:
  detecting from the tag data whether the given processing resource is of a required resource type;
  detecting from the lock status data whether the given processing resource is currently unlocked; and
  in response to the given processing resource being detected to be currently unlocked and of the required resource type, performing a predetermined action with respect to one or both of the lock status data and the tag data,
wherein whether to perform the predetermined action in response to the given processing resource being detected to be currently unlocked is determined depending on the detection from the tag data of whether the given processing resource is of the required resource type.

* * * * *